United States Patent [19]

Tessler

[11] 4,330,365
[45] May 18, 1982

[54] PAPER CONTAINING CATIONIC STARCH GRAFT COPOLYMERS FROM STARCH, N,N'-METHYLENEBISACRYLAMIDE, AND POLYAMINES

[75] Inventor: Martin M. Tessler, Edison, N.J.

[73] Assignee: National Starch and Chemical Corporation, Bridgewater, N.J.

[21] Appl. No.: 230,239

[22] Filed: Feb. 2, 1981

Related U.S. Application Data

[62] Division of Ser. No. 138,015, Apr. 7, 1980, Pat. No. 4,278,573.

[51] Int. Cl.$^3$ .............................................. D21H 3/28
[52] U.S. Cl. ............................. 162/168 NA; 162/175
[58] Field of Search ........................ 162/168 NA, 175; 260/17.4 GC

[56] References Cited

U.S. PATENT DOCUMENTS

| 2,759,913 | 8/1956 | Hulse ................................. 528/341 |
| 2,867,607 | 1/1959 | Jen ..................................... 525/421 |
| 2,977,245 | 3/1961 | Jen ..................................... 428/417 |
| 3,035,045 | 5/1962 | Trimmel ............................. 536/47 |
| 3,785,921 | 1/1974 | Ide et al. ..................... 260/17.4 GC |
| 3,962,159 | 6/1976 | Ray-Chaudheri .......... 260/17.4 GC |
| 4,060,507 | 11/1977 | Floyd et al. ................. 162/168 NA |
| 4,066,495 | 1/1978 | Voight et al. ............... 162/168 NA |

FOREIGN PATENT DOCUMENTS 47-7179 5/1972 Japan.

OTHER PUBLICATIONS

Chem. Abstracts, 81:54098.

*Primary Examiner*—William F. Smith
*Attorney, Agent, or Firm*—Edwin Szala; Margaret B. Kelley

[57] ABSTRACT

Novel cationic starch-g-poly(N,N'-methylenebisacrylamide-co-amine) copolymers, useful as pigment retention aids for paper, are prepared by reacting a starch base with N,N'-methylenebisacrylamide and a polyamine or with preformed copolymer. The reactions are carried out at 15° to 80° C. for 0.5 to 20 hours under alkaline conditions using an aqueous slurry or dispersion of a starch base and preferably a salt such as sodium sulfate. The starch base may be derivatized, prior to the graft copolymerization, to introduce ether groups. The polyamines contain at least two amine groups selected from primary and secondary amines; preferably they contain up to 4 amine nitrogens, some of which may be unreactive tertiary amine nitrogens. The starch-g-coplymers are used in amounts of from about 0.05 to 2.0% by weight, based on the dry pulp. The reaction mixture itself may be added directly to the paper stock.

13 Claims, No Drawings

PAPER CONTAINING CATIONIC STARCH GRAFT COPOLYMERS FROM STARCH, N,N'-METHYLENEBISACRYLAMIDE, AND POLYAMINES

This application is a division of application Ser. No. 138,015, filed Apr. 7, 1980, now U.S. Pat. No. 4,278,573.

BACKGROUND OF THE INVENTION

This invention relates to novel cationic starch-graft-copolymers having copolymeric side chains comprising copolymers of N,N'-methylenebisacrylamide and various polyamines and to methods for the preparation of such starch-graft-copolymers. This invention also relates to starch-graft-copolymers which contain, in addition to the cationic copolymeric side chain, other substituent groups on the starch base. This invention further relates to the use of these novel cationic starch-graft-copolymers in various papermaking processes, especially to their use as pigment retention aids.

As used herein, the term "starch-g-poly(N,N'-methylenebisacrylamide-co-amine) copolymer" refers to a starch base having copolymeric side chains grafted onto the hydroxyl groups of the starch molecule, wherein the grafted side chains, straight or branched, are copolymers of N,N'-methylenebisacrylamide and various polyamines and the copolymeric side chains are added to the starch base through the opening of the double bond of N,N'-methylenebisacrylamide. The term "polyamine" refers to amines containing at least two amine groups selected from the group consisting of primary and secondary amines. In addition, the polyamines may contain unreactive tertiary nitrogen atoms and may be straight chain, branched, or cyclic polyamines.

As used herein, the term "paper" refers to sheet-like masses and molded products made from fibrous cellulosic materials which may be derived from natural sources, as well as from synthetics such as polyamides, polyesters, and polyacrylic resins, and from mineral fibers such as asbestos and glass. In addition, papers made from combinations of cellulosic and synthetic materials are applicable herein. Paperboard is also included within the broad term "paper".

It is well known to form graft copolymers of starch by free-radical-initiated polymerizations, in some cases by anionic polymerizations, and in a few cases by grafting preformed homopolymers onto starch derivatives or starch. A discussion of such polymerization methods may be found in "Block and Graft Copolymers", ed. by R. J. Ceresa (New York: John Wiley & Sons, 1973), pp. 1-24.

It is well known to use starch and starch derivatives as aids in various paper making processes such as wet end, sizing, and coating applications. It is also well known to use cationic starch ether derivatives as pigment retention aids. U.S. Pat. No. 3,962,159 suggests the use, as wet strength additives for paper, of starch graft copolymers formed by a condensation reaction of starch and preformed polyamide-amines.

It is an object of the present invention to provide novel cationic starch-graft-copolymers, useful as pigment retention aids, and to provide an "in situ" and "preformed copolymer" method for their preparation from N,N'-methylenebisacrylamide and various polyamines by a non-radical addition reaction.

SUMMARY OF THE INVENTION

The above and related objects are achieved by the preparation of novel cationic starch-g-poly(N,N'-methylenebisacrylamide-co-amine) copolymers wherein the amine group is provided by a polyamine containing at least two amine groups which are primary or secondary amines or mixtures thereof. The polyamines may contain up to 4 amine nitrogens, some of which may be unreactive tertiary amine nitrogens.

In one method of this invention the starch-g-copolymers are prepared by reacting a modified or unmodified starch base with about 1 to 75% by weight of N,N'-methylenebisacrylamide and 1 to 75% of a polyamine, both based on the dry starch. Suitable polyamines include ethylenediamine, 3,3'-diamino-N-methyldipropylamine, piperazine, 1,3-cyclohexanebis(methylamine), N,N'-bis(3-aminopropyl)piperazine, N-methyl-1,3-propanediamine, and triethylenetetramine. The reactions are carried out simultaneously at 15° to 80° C. for 0.5 to 20 hours under alkaline conditions using an aqueous slurry or dispersion of a starch base and preferably a salt such as sodium sulfate.

In another method of this invention the starch-g-copolymers are prepared by reacting the starch base with about 2 to 100% by weight, based on the dry starch, of a preformed copolymer of N,N'-methylenebisacrylamide and a polyamine. The reaction is carried out in substantially the same manner as described hereinabove.

The starch base may be derivatized, prior to the graft copolymerization, by the introduction of substituent groups such as diethyl aminoethyl or hydroxypropyl groups or similar ether groups.

The novel cationic starch-graft-copolymers of this invention may be used as wet end additives and in many other applications wherein cationic starch derivatives are commonly used. They are particularly useful as pigment retention aids in papermaking processes.

DESCRIPTION OF THE PREFERRED EMBODIMENTS

The applicable starch bases which may be used in preparing the starch-g-copolymers herein may be derived from any plant source including corn, potato, sweet potato, wheat, rice, sago, tapioca, waxy maize, sorghum, high amylose corn, or the like. Also included are the conversion products derived from any of the latter bases including, for example dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized starches such as ethers. The starch base may be a granular starch or a gelatinized starch, i.e. non-granular starch.

The applicable polyamines which may be used in preparing the starch-g-copolymers or preformed copolymers herein may be diamines and higher polyamines including members of the ethyleneamine family. The higher molecular weight members of these families such as triethylene-tetramine are generally mixtures of linear, branched and cyclic isomers and it is possible to use such mixtures, generally obtained when ethylene dichloride is treated with ammonia, in these preparations.

Typical straight chain and branched polyamines include ethylenediamine, 1,3-propanediamine, 3,3'- diamino-N-methyldipropylamine, and N,N'-bis(3-aminopropyl)piperazine (containing at least two primary amines), as well as N-methyl-1,3-propanediamine, diethylenetriamine, triethylenetetramine, bis(trimethylene)triamine, and iminobispropylamine (containing at least one primary and one secondary amine).

Typical cyclic amines include those containing the reactive amine groups within the ring such as piperazine and homopiperazine (containing two secondary amines), those containing the reactive amine groups attached directly to the ring such as 1,3- or 1,4-cyclohexanediamine (hereafter referred to as cycloalkylene substituted amines), and those containing reactive amine groups not directly attached to the ring such as 1,3-cyclohexanebis(methylamine) (hereafter referred to as cycloalkylalkylenes).

The preformed (N,N'-methylenebisacrylamide-amine) copolymer used in one method of this invention may itself be prepared by reacting N,N'-methylenebisacrylamide with a polyamine at 15°–30° C. for 0.5 to 2.5 hours under alkaline conditions. Short reaction times are required to form low molecular weight prepolymers which still retain reactive double bonds for reaction with starch and to prevent extensive crosslinking and gel formation of the prepolymer.

The "in situ" starch reactions of this invention and the starch-g-copolymer resulting from both the "in situ" and "preformed copolymer" reactions may be represented by the equation:

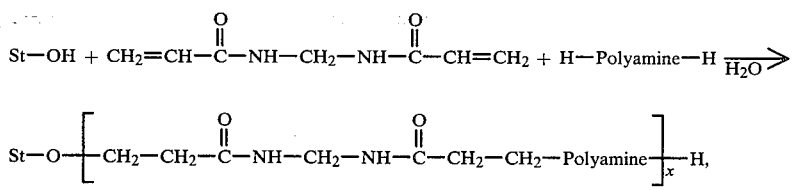

wherein H-Polyamine-H is a straight chain, branched, or cyclic aliphatic polyamine, optionally containing up to 4 amine nitrogens which are primary, secondary, or tertiary amine nitrogens, with at least two of the amine nitrogens being primary and/or secondary amine nitrogens, and wherein the primary or secondary amine nitrogens may be substituted by a $C_1$–$C_3$ alkyl or aminoalkyl, a $C_2$–$C_3$ alkylene, a $C_5$–$C_6$ cycloalkylene, or a $C_7$–$C_{10}$ cycloalkylalkylene and the tertiary amine nitrogens are substituted by a $C_1$–$C_3$ alkyl or aminoalkyl or a $C_2$–$C_3$ alkylene.

The practitioner will recognize that the final structure of the resulting starch-g-copolymers cannot be predicted since branching is possible when the polyamines contain primary amine groups and since some starch crosslinking may occur. In addition, the end group of the graft may be formed from the N,N'-methylenebisacrylamide rather than the polyamine as is shown in the above equation. The practitioner will also recognize that the starch molecule is a polymer which contains many anhydroglucose units, each having three free hydroxyl groups (except the non-reducing end glucose units which contain four free hydroxyl groups) which may react with N,N'-methylenebisacrylamide. Thus, the number of grafts will vary with the particular starch, the ratios of N,N'-methylenebisacrylamide or preformed copolymer to starch, and, to some extent, the reaction conditions. Furthermore, since it is known that the relative reactivity of each of the hydroxyl groups within the anhydroglucose unit is not equivalent, it is probable that some will be more reactive with N,N'-methylenebisacrylamide or with the preformed copolymers than others.

In the methods of this invention, the reactions are carried out in an aqueous alkaline medium using either an aqueous slurry or an aqueous dispersion of the starch base.

The amount of N,N'-methylenebisacrylamide and polyamine to be employed in the reaction with the starch base herein should be adjusted so that the ratio of double bonds to the total number of primary and secondary amines will be about one, e.g. one mole of N,N'-methylenebisacrylamide (which contains two double bonds) will be reacted with about one mole of 1,2-ethylendiamine (which contains two primary amines) but with only about 0.5 mole of triethylenetetramine (which contains two primary and two secondary amines or a total of four reactive amines). Too large an excess of polyamine will result in the preferential formation of copolymer and inhibit grafting to the starch base. Too large an excess of N,N'-methylenebisacrylamide will lead to a highly cross-linked product.

In practice, from about 1 to 75% of N,N'-methylenebisacrylamide and polyamine, both based on dry starch, may be used, depending on such factors as the starch base used, the polyamine used, the degree of grafting required in the end product, and, to some extent, the reaction conditions used. In general the preferred amounts of N,N'-methylenebisacrylamide and polyamine monomer are 2 to 12% for granular starches and 2 to 20% for non-granular starches.

The amount of preformed copolymer to be employed in the reaction with the starch base herein will also vary from about 2 to 100% by weight, based on the weight of dry starch, depending on the factors discussed hereinabove. The preferred amount is 3 to 15% for granular starches and 3 to 30% for non-granular starches.

The N,N'-methylenebisacrylamide and polyamine or the preformed copolymer may be added to the reaction mixture as a solid or liquid and the order of addition of N,N'-methylenebisacrylamide and polyamine is usually not important. However, to minimize crosslinking of the starch, it is preferable to add the polyamine first and then add the N,N'-methylenebisacrylamide. The starch reaction is carried out under alkaline conditions. In the presence of 15% or less of sodium sulfate, at least 2.0% sodium hydroxide, both based on starch, must be added for grafting to occur. In the presence of more than 15% of sodium sulfate, no sodium hydroxide is required and the alkalinity of the polyamine is sufficient for grafting to occur. The sodium hydroxide may be added to the starch slurry or dispersion either prior to or after the addition of N,N'-methylenebisacrylamide and polyamine or preformed copolymer.

The reaction is carried out at a temperature of from 15°–80° C., preferably 20°–50° C. It will be recognized by the practitioner that the use of temperatures above about 60° C. with granular starches in an aqueous medium will result in granule swelling and filtration difficulties or in gelatinization of the starch.

When conducting the reaction with granular starches, it is preferable to carry out the reaction in the presence of salts, e.g. sodium sulfate, in an amount of from about 20 to 50% by weight, based on the dry starch. The presence of sodium sulfate acts to suppress swelling of the starch, thus giving a more filterable product and also promotes grafting to starch at much lower sodium hydroxide levels.

The reaction mixture is agitated under the desired reaction conditions. The reaction time may vary from 0.5 to 20 hours, depending on such factors as the amount, stability and reactivity of the polyamine employed, the temperature, the pH, the scale of the reaction, and the degree of grafting desired. In general, the preferred range of reaction times is from 1 to 6 hours.

After completion of the reaction, the pH of the reaction mixture is adjusted to a value of between about 3 and 7 using any suitable commercial acid, such as hydrochloric acid, sulfuric acid, acetic acid and the like. Such acids may be conveniently added as a dilute aqueous solution.

Recovery of the resulting starch ethers may be readily accomplished, with the particular method employed being dependent on the form of the starch base. Thus, a granular starch is recovered by filtration, optionally washed with water to remove any residual salts, and dried. The granular starch products may also be drum-dried, spray-dried, or gelatinized and isolated by alcohol precipitation or freeze drying to form non-granular products (i.e. gelatinized). If the starch product is non-granular, it may be purified by dialysis to remove residual salts and optionally isolated by alcohol precipitation, freeze drying, or spray drying.

In addition to preparing the cationic starch-g-copolymers, it is also within the scope of this invention to prepare derivatized starch-g-copolymers which contain, in addition to the grafted cationic copolymeric side chain, other substituent groups attached to the starch through ether linkages. The general methods for preparing such derivatized starches are well known and discussed in "Starch: Chemistry and Technology", Vol. II, Chapter XIII, ed. by R. L. Whistler and E. F. Pascall (New York: Academic Press, 1967).

It can be appreciated by the practitioner that a large number of variations may be effected in reacting the starch base with N,N'-methylenebisacrylamide and polyamines or with the preformed copolymers in accordance with the reaction procedures described above without materially departing from the scope and spirit of the invention. Such variations will be evident to those skilled in the art and are to be included within the scope of this invention.

The novel starch-g-copolymers of this invention may be used as wet end additives and in many other applications wherein such cationic starch derivatives are commonly used, such as in coatings, sizes, oven cleaners, textile printing, and the like. The cationic starch-g-copolymers herein are particularly useful as pigment retention aids in the manufacture of paper.

The cationic starch-g-copolymers herein are used in their dispersed (i.e. cooked) form mainly as beater additives, although their addition to the pulp may occur at any point in the paper-making process prior to the ultimate conversion of the wet pulp into a dry web or sheet. Thus, for example, they may be added to the pulp while the latter is in the headbox, beater, hydropulper or stock chest.

The pigment retention aids of this invention may be effectively used for addition to pulp prepared from any types of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical chemi-ground wood, ground wood or any combination of these fibers. Fibers of the viscous rayon or regenerated cellulose type may also be used if desired.

Any desired inert mineral fillers may be added to the pulp which is to be modified with the starch-g-copolymers herein. Such materials include clay, titanium dioxide, talc, calcium carbonate, calcium sulfate and diatomaceous earths. Rosin or synthetic internal size may also be present, if desired.

The proportion of the starch-g-copolymer to be incorporated into the paper pulp may vary in accordance with the particular pulp involved. In general, it is preferred to use about 0.05 to 2.0% of the starch-g-copolymer, based on the dry weight of the pulp. Within this preferred range the precise amount which is used will depend upon the type of pulp being used, the specific operating conditions, and the particular end use for which the paper is intended. The use of amounts of stach-g-copolymer greater than 2%, based on the dry weight of the pulp, is not precluded, but is ordinarily unnecessary in order to achieve the desired improvements. When added in the proper concentrations, the starch-g-copolymers herein serve to increase pigment retention while maintaining the resistance of the finished sheet to folding, picking and scuffing.

The following examples will more fully illustrate the embodiments of this invention. In the examples, all parts are given by weight, all percentages are determined on a dry basis (D.B.) based on dry starch, and all temperatures are in degrees Celsius unless otherwise noted. The nitrogen content of the cationic starch graft copolymers was determined by the Kjeldahl method.

EXAMPLE I

This example illustrates the preparation of granular, cationic starch-g-poly(N,N'-methylenebisacrylamide-co-ethylenediamine) copolymers using corn starch as the base. It further illustrates that the sequence in which the N,N'-methylenebisacrylamide and polyamine are added is not important.

Starch-g-Copolymer A

A total of 200 parts of corn starch was added to a solution of 50 parts sodium sulfate and 6 parts sodium hydroxide in 250 parts water. Then 6.0 parts of 1,2-ethylenediamine were added to the mixture, followed by 15.4 parts N,N'-methylenebisacrylamide. The reaction mixture was agitated for 6 hours at 45° C. The pH was lowered from 12.5 to 3.0 with 9.5% aqueous hydrochloric acid. The starch-g-copolymer was recovered by filtration, washed with water, and dried. It contained 1.8% N (D.B.).

Starch-g-Copolymer B

The reaction was carried out in the same manner as above except that the N,N'-methylenebisacrylamide was added before the 1,2-ethylenediamine. The starch-g-copolymer contained 1.6% N (D.B.)

EXAMPLE II

This example illustrates the preparation of non-granular, cationic starch-g-poly(N,N'-methylenebisacrylamide-co-piperazine) copolymers and a starch-g-poly(N,N'-methylenebisacrylamide-co-3,3'-diamino-N-methyldipropylamine) copolymer using waxy maize as the starch base and using various reaction temperatures.

Starch-g-Copolymer C

A total of 100 parts of a waxy maize starch (which had been acid converted to a degree known in the trade as 50 fluidity) was added to 300 parts water. The suspension was heated at 100° C. for 10 minutes to gelatinize the starch and then cooled to room temperature (about 23°–25° C.). Then 100 parts of 3% aqueous sodium hydroxide (3 parts D.B.), 8.6 parts piperazine, and finally 15.4 parts N,N'-methylenebisacrylamide were added to the reaction mixture. The mixture was agitated at 25° C. for 6 hours. The pH was lowered from 12.6 to 3.0 by the addition of 10% aqueous hydrochloric acid. The starch-g-copolymer was purified by dialysis and recovered by freeze drying. It contained 1.25% N (D.B.)

Starch-g-Copolymer D was prepared in the same manner as above except that the reaction temperature was 40° C. instead of 25° C. It contained 1.20% N (D.B.).

Starch-g-Copolymer E was prepared in the same manner as above except that the reaction temperature was 60° C. instead of 25° C. It contained 1.57% N (D.B.).

Starch-g-Copolymer F was prepared by adding a total of 25 parts of a waxy maize starch (acid-converted to 85 fluidity) to 150 parts water. The suspension was heated at 100° C. for 20 minutes and then cooled to room temperature. Then 25 parts of 3% aqueous sodium hydroxide (0.75 parts D.B.) were added, followed by 10.9 parts of 3,3'-diamino-N-methyldipropylamine and 11.6 parts N,N'-methylenebisacrylamide. The mixture was agitated at 25° C. for 6 hours. The pH was lowered from 12.1 to 3.0 by the addition of 10% aqueous hydrochloric acid. The starch-g-copolymer was isolated by precipitation from ethanol, washed with ethanol, and dried. It contained 7.9% N (D.B.).

EXAMPLE III

This example illustrates the preparation of additional cationic, starch-g-copolymers using various polyamines. The reactions were carried out by adding 100 parts of corn starch to a solution containing 3 parts sodium hydroxide and 25 parts sodium sulfate in 125 parts water. The polyamine monomer was then added, followed by the N,N'-methylenebisacrylamide. The reaction mixture was agitated at 45° C. for the indicated time. The pH was then lowered from about 12 (11.9–12.6 range) to 3.0 by the addition of 9.6% aqueous hydrochloric acid. The starch-g-copolymers were recovered by filtration, washed with water, and dried. The results are shown in Table I.

TABLE I

| Polyamine (name) | (parts) | NNMBA* (parts) | Reaction Time (hr) | Nitrogen Content (%) |
|---|---|---|---|---|
| 1,3-cyclohexanebis(methylamine) | 10.65 | 11.55 | 6 | 2.78 |
| 1,3-cyclohexanebis(methylamine) | 5.33 | 5.77 | 6 | 1.49 |
| 3,3'-diamino-N-methyldipropylamine | 10.88 | 11.55 | 6 | 3.39 |
| 3,3'-diamino-N-methyldipropylamine | 5.44 | 5.77 | 6 | 1.84 |
| N,N'-bis(3-aminopropyl)piperazine | 5.00 | 3.85 | 17 | 1.70 |
| N,N'-bis(3-aminopropyl)piperazine | 3.33 | 2.57 | 17 | 1.13 |
| N-methyl-1,3-propanediamine | 4.40 | 7.70 | 6 | 1.66 |
| Triethylenetetramine | 3.65 | 7.70 | 6 | 2.40 |

*N,N'-methylenebisacrylamide

EXAMPLE IV

This example illustrates the preparation of granular, cationic starch-g-poly(N,N'-methylenebisacrylamide-co-ethylenediamine) copolymers using previously substituted starch ether derivatives as the starch base. Starch-g-Copolymer G was prepared by adding 25 parts of a corn starch derivative containing diethyl aminoethyl ether groups to a solutin of 6.25 parts sodium sulfate and 0.75 parts sodium hydroxide in 32 parts water. Then 0.57 parts of 1,2-ethylenediamine was added to the mixture, followed by 1.45 parts N,N'-methylenebisacrylamide. The reaction mixture was agitated for 6 hours at 45° C. The pH was lowered from 12.2 to 3.0 by the addition of 10% aqueous hydrochloric acid. The starch-g-copolymer was recovered by filtration, washed with water, and dried. It contained 1.06% N (D.B.).

The starch derivative used as the starting material was obtained by treating corn starch with diethylaminoethyl chloride hydrochloride according to the method described in U.S. Pat. No. 2,813,093; it contained 0.25% N (D.B.).

Starch-g-Copolymer H was prepared in the same manner as above except that a waxy maize starch derivative containing hydroxypropyl ether groups as well as mono- and/or diphosphate groups was used and the water content was increased to 38 parts. The starch-g-copolymer contained 0.77% N (D.B.).

The starch derivative used as the starting material was obtained by treating a waxy maize starch with 6.5% propylene oxide and 0.02% phosphorous oxychloride according to the method described in U.S. Pat. No. 3,422,088.

EXAMPLE V

This example shows the effect of the sodium hydroxide concentration and sodium sulfate concentration on the preparation of cationic starch-g-poly(N,N'-methylenebisacrylamide-co-ethylenediamine) copolymers.

Each of the graft copolymerizations was carried out in the same manner as in Example I (Starch-g-Copolymer A); however the sodium hydroxide and sodium sulfate levels were varied. The results are shown in Table II.

The results show that when 20–35% sodium sulfate was present, the grafting efficiency was better, for the same level of sodium hydroxide addition, that when only 0.14 15% sodium sulfate was present. Increasing the amount of sodium hydroxide added, while maintaining the sodium sulfate amount constant, also improved the grafting efficiency. When no sodium sulfate was present, no grafting occurred until the sodium hydroxide concentration reached 2.0%. When 15% or less of sodium sulfate was present, no grafting occurred even when 1% sodium hydroxide was present.

TABLE II

| Sodium Hydroxide (%) | Sodium Sulfate (%) | Nitrogen Content (%) |
|---|---|---|
| 0 | 5 | 0.09 |
| 0 | 10 | 0.12 |
| 0 | 15 | 0.10 |
| 0 | 20 | 0.93 |
| 0 | 25 | 1.14 |
| 0 | 35 | 1.01 |
| 1.0 | 0 | 0.10 |
| 1.0 | 5 | 0.10 |
| 1.0 | 10 | 0.09 |
| 1.0 | 15 | 0.22 |
| 1.0 | 20 | 1.25 |
| 1.0 | 25 | 1.25 |
| 1.0 | 35 | 2.04 |
| 0.8 | 0 | 0.08 |
| 1.0 | 0 | 0.10 |
| 1.2 | 0 | 0.12 |
| 1.4 | 0 | 0.10 |
| 1.6 | 0 | 0.10 |
| 1.8 | 0 | 0.11 |
| 2.0 | 0 | 0.54 |
| 0 | 25 | 1.14 |
| 0.6 | 25 | 1.16 |
| 1.3 | 25 | 1.28 |
| 2.0 | 25 | 1.49 |
| 3.0 | 25 | 1.80 |

EXAMPLE VI

This example illustrates the effect of variations in reaction time on the preparation of the cationic starch-g-poly(N,N'-methylenebisacrylamide-co-ethylendiamine) copolymers.

Each of the polymerizations was carried out in the same manner as in Example I (Starch-g-Copolymer A) except that the reaction time was varied. The results are shown in Table III.

TABLE III

| Reaction Time (hr.) | Nitrogen Content (%) |
|---|---|
| 1 | 1.38 |
| 3 | 1.65 |
| 6 | 1.80 |

The results show that the grafting reaction is quite rapid.

EXAMPLE VII

This example illustrates the preparation of cationic starch-g-poly(N,N'-methylenebisacrylamide-co-ethylenediamine) copolymers using an "in-situ" process and a "preformed copolymer" process and the use of these starch-g-copolymers as pigment retention aids in the manufacture of paper.

PART I

Starch-g-Copolymer I ("in-situ" process)

A total of 100 parts of a waxy maize starch (acid-converted to 85 fluidity) was added to 400 parts water. The suspension was heated at 100° C. for 15 minutes to gelatinize the starch and then cooled to room temperature. Then 100 parts of 3% aqueous sodium hydroxide (3 parts D.B.), 6.0 parts 1,2-ethylenediamine, and 15.4 parts N,N'-methylenebisacrylamide were added. The mixture was agitated at room temperature for 6 hours. The pH was lowered from 12.0 to 3.0 by the addition of 9.5% aqueous hydrochloric acid. A small aliquot was removed and purified by dialysis. The starch-g-copolymer contained 1.05% N (D.B.).

Starch-g-Copolymer J ("preformed copolymer" process)

A total of 100 parts of a waxy maize starch (acid-converted to 50 fluidity) was added to 150 parts water. The suspension was heated at 100° C. for 23 minutes and then cooled to room temperature. Then 110 parts of 3% aqueous sodium hydroxide (3.3 parts D.B.) and 96 parts of a 22.2% aqueous preformed copolymer solution (21.3 parts D.B.) were added. The mixture was agitated at 40° C. for 5 hours and then cooled. The pH was lowered from 11.8 to 6.5 with 10% aqueous hydrochloric acid. An aliquot was removed, purified by dialysis, and freeze dried. The starch-g-copolymer contained 2.14% N (D.B.).

The preformed copolymer solution was prepared by adding 15.4 parts N,N'-methylenebisacrylamide to 75 parts water and then slowly adding 6.0 parts 1,2-ethylenediamine while cooling the reaction mixture in an ice bath to maintain the temperature at less than 30° C. After the addition was completed, the mixture was agitated for 2 hours at 20°–30° C. The pH was then lowered from 11.5 to 6.5 by the addition of hydrochloric acid.

Starch-g-Copolymer K ("preformed copolymer" process)

The starch-g-copolymer was prepared in the same manner as above except that a waxy maize starch acid hydrolyzed to 85 fluidity was used. It contained 2.53% N (D.B.).

PART II

Each of the cationic starch-g-copolymers prepared above was added to a bleached sulfite pulp in such an amount so as to provide 0.10% by weight solids, based on the quantity of pulp solids. The pulp also contained 10% by weight of titanium dioxide, based on pulp solids; it contained no alum.

Pigment retention values for test paper stocks and those for a comparative sample were determined by first preparing paper sheets on the Williams Standard Sheet Mold and then testing for the percentage of titanium dioxide retained by the method described in TAPPI Standard #T413 m.58. The comparative sample was a cationic starch ether derivative of the prior art, i.e. the diethylaminoethyl ether of corn starch; it contained 0.29% N (D.B.) and was prepared as described in U.S. Pat. No. 2,813,093. The pigment retention of a blank which contained no pigment retention aid was also determined. The results are shown in Table IV.

TABLE IV

| Material Tested | TiO$_2$ Retention (%) |
|---|---|
| Blank | 28.1 |
| Starch-g-Copolymer I | 62.0 |
| Starch-g-Copolymer J | 64.2 |
| Starch-g-Copolymer K | 56.5 |
| Diethylaminoethyl Starch Ether (comparative) | 59.7 |

The above data indicates that the addition of the cationic starch-g-copolymers of this invention improved the pigment retention.

Summarizing, this invention is seen to provide novel cationic starch-g-copolymers and derivatized starch-g-copolymers containing copolymeric side chains of N,N'-methylenebisacrylamide and various polyamines. All of these starch-g-copolymers may be used as pigment retention aids in paper.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. In a method for making paper containing pigment, the step which comprises adding, as a pigment retention aid, to the stock at any stage prior to forming a web, a starch-g-poly(N,N'-methylenebisacrylamide-co-amine) copolymer—comprising a N,N'-methylenebisacrylamide-amine copolymer grafted to a starch base through said N,N'-methylenebisacrylamide,—wherein said amine is a polyamine containing at least two primary or secondary amine groups or mixtures thereof, said starch-g-copolymer being added to said stock in an amount of from about 0.05 to 2.0% by weight, based on said dry pulp.

2. The method of claim 1, wherein said polyamine is selected from the group consisting of ethylenediamine, 3,3'-diamino-N-methyldipropylamine, 1,3-cyclohexanebis(methylamine), N,N'-bis(3-aminopropyl)piperazine, piperazine, N-methyl-1,3-propanediamine, and triethylenetetramine.

3. In the method of claim 1 wherein said starch-g-poly(N,N'-methylenebisacrylamide-co-amine) copolymer is added as the reaction mixture obtained by reacting a starch base with about 1 to 75% of a N,N'-methylenebisacrylamide and with about 1 to 75% of a polyamine in an aqueous alkaline medium in the presence of more than 15% of sodium sulfate, all based on said dry starch.

4. In the method of claim 1, wherein said starch-g-poly(N,N'-methylenebisacrylamide-co-amine) copolymer is added as the reaction mixture obtained by reacting a starch base with about 1 to 75% of a N,N'-methylenebisacrylamide and with about 1 to 75% of a polyamine in an aqueous alkaline medium in the presence of 0 to 20% of sodium sulfate and at least 2% sodium hydroxide, all based on said dry starch.

5. In the method of claim 1, wherein said starch-g-poly(N,N'-methylenebisacrylamide-co-amine) copolymer is added as the reaction mixture obtained by reacting a starch base with about 2 to 100% of a preformed copolymer of N,N'-methylenebisacrylamide and a polyamine in an aqueous alkaline medium in the presence of more than 15% sodium sulfate, all based on said dry starch.

6. In the method of claim 1, wherein said starch-g-poly(N,N'-methylenebisacrylamide-co-amine) copolymer is added as the reaction mixture obtained by reacting a starch base with about 2 to 100% of a preformed copolymer of N,N'-methylenebisacrylamide and a polyamine in an aqueous alkaline medium in the presence of 0 to 20% sodium sulfate and at least 2% sodium hydroxide, all based on said dry starch.

7. A paper containing pigment and having dispersed therein, as a pigment retention aid, a starch-g-poly(N,N'-methylenebisacrylamide-co-amine) copolymer comprising a N,N'-methylenebisacrylamide-amine copolymer grafted to a starch base through said N,N'-methylenebisacrylamide, wherein said amine is a polyamine containing at least two primary or secondary amine groups and mixtures thereof and wherein said paper is prepared from a papermaking stock containing from about 0.05 to 2.0% of said starch-g-copolymer by weight of dry pulp.

8. The paper of claim 7, wherein said polyamine is a straight chain, branched or cyclic aliphatic polyamine containing up to 4 amine nitrogens which are primary, secondary, or tertiary amine nitrogens, wherein said primary or secondary amine nitrogens may be substituted by a $C_1$–$C_3$ alkyl or aminoalkyl, a $C_2$–$C_3$ alkylene, a $C_5$–$C_6$ cycloalkylene, or a $C_7$–$C_{10}$ cycloalkylalkylene and said tertiary amine nitrogens are substituted by a $C_1$–$C_3$ alkyl or aminoalkyl or a $C_2$–$C_3$ alkylene.

9. The paper of claim 8, wherein said polyamine is selected from the group consisting of ethylenediamine, 3,3'-diamino-N-methyldipropylamine, 1,3-cyclohexanebis(methylamine), N,N'-bis(3-aminopropyl)piperazine, N-methyl-1,3-propanediamine, and triethylenetetramine.

10. The paper of claim 7, wherein said starch-g-copolymer contains ether substituent groups on said starch.

11. The paper of claim 10, wherein said substituent groups are diethylaminoethyl ether or hydroxypropyl ether groups.

12. The paper of claim 9, wherein said starch-g-poly(N,N'-methylenebisacrylamide-co-amine) copolymer is added as the reaction mixture obtained by reacting a starch base with about 2 to 100% of a preformed copolymer of N,N'-methylenebisacrylamide and said polyamine in an aqueous alkaline medium in the presence of more than 15% sodium sulfate, all based on said dry starch.

13. The paper of claim 9, wherein said starch-g-poly(N,N'-methylenebisacrylamide-co-amine) copolymer is the reaction mixture obtained by reacting a starch base with about 2 to 100% of a preformed copolymer of N,N'-methylenebisacrylamide and said polyamine in an aqueous alkaline medium in the presence of 0 to 20% sodium sulfate and at least 2% sodium hydroxide, all based on said dry starch.

* * * * *